(12) United States Patent
Korhonen et al.

(10) Patent No.: US 11,991,705 B2
(45) Date of Patent: May 21, 2024

(54) INDICATION OF HARQ-ACK CODEBOOK FOR RETRANSMISSION

(71) Applicant: Nokia Technologies Oy, Espoo (FI)

(72) Inventors: Juha Sakari Korhonen, Espoo (FI); Klaus Hugl, Vienna (AT)

(73) Assignee: Nokia Technologies Oy, Espoo (FI)

( * ) Notice: Subject to any disclaimer, the term of this patent is extended or adjusted under 35 U.S.C. 154(b) by 346 days.

(21) Appl. No.: 17/682,812

(22) Filed: Feb. 28, 2022

(65) Prior Publication Data

US 2022/0330307 A1    Oct. 13, 2022

Related U.S. Application Data

(60) Provisional application No. 63/172,138, filed on Apr. 8, 2021.

(51) Int. Cl.
| | |
|---|---|
| *H04W 72/21* | (2023.01) |
| *H04L 1/1607* | (2023.01) |
| *H04L 1/1812* | (2023.01) |
| *H04W 72/23* | (2023.01) |

(52) U.S. Cl.
CPC .......... *H04W 72/21* (2023.01); *H04L 1/1607* (2013.01); *H04L 1/1812* (2013.01); *H04W 72/23* (2023.01)

(58) Field of Classification Search
CPC .......... H04W 4/005; H04W 4/70; H04L 67/12
USPC ......................................................... 370/329
See application file for complete search history.

(56) References Cited

U.S. PATENT DOCUMENTS

| | | |
|---|---|---|
| 2020/0092869 A1 | 3/2020 | Hwang et al. |
| 2020/0213981 A1 | 7/2020 | Park et al. |

FOREIGN PATENT DOCUMENTS

| | | | | |
|---|---|---|---|---|
| CN | 112787769 A | * | 5/2021 | ........... H04L 1/1812 |
| CN | 114616919 B | * | 2/2024 | ........... H04L 1/1812 |
| WO | 2020/034533 A1 | | 2/2020 | |

OTHER PUBLICATIONS

"Revised WID: Enhanced Industrial Internet of Things (IoT) and ultra-reliable and low latency communication (URLLC) support for NR", 3GPP TSG RAN Meeting #88e, RP-201310, Agenda: 9.10.5, Nokia, Jun. 29-Jul. 3, 2020, 6 pages.

(Continued)

*Primary Examiner* — Anthony Mejia
(74) *Attorney, Agent, or Firm* — Nokia Technologies Oy

(57) ABSTRACT

In accordance with example embodiments of the invention there is at least a method and apparatus to identify, by a user equipment of a communication network, downlink control information (DCI) indicating that at least one hybrid automatic repeat request-acknowledgment (HARQ-ACK) codebook scheduled earlier for transmission needs to be re-transmitted in a physical uplink control channel (PUCCH) occasion indicated by the DCI and identifying which at least one HARQ-ACK codebook scheduled earlier for transmission needs to be re-transmitted in the PUCCH occasion. And based on the DCI, prepare the PUCCH for re-transmitting the identified at least one HARQ-ACK codebook in the PUCCH occasion. Further, to determine and transmit, by a network equipment of a communication network, the DCI to the user equipment of the communication network and to receive the PUCCH for re-transmitting the at least one HARQ-ACK codebook in the PUCCH occasion from the user equipment.

24 Claims, 7 Drawing Sheets

(56) References Cited

OTHER PUBLICATIONS

"Moderator summary #2 on HARQ-ACK feedback enhancements for NR Rel-17 URLLC/IIoT", 3GPP TSG-RAN WG1 Meeting #104-e, R1-2101818, Agenda: 8.3.1.1, Nokia, Jan. 25-Feb. 5, 2021, pp. 1-174.

"Discussion on HARQ-ACK enhancements for eURLLC", 3GPP TSG RAN WG1 Meeting #104-e, R1-2100101, Agenda: 8.3.1.1, ZTE, Jan. 25-Feb. 5, 2021, pp. 1-14.

Tentative Rejection received for corresponding Taiwan Patent Application No. 111111144, dated Sep. 28, 2022, 41 pages of Tentative Rejection and 6 pages of translation available.

Extended European Search Report received for corresponding European Patent Application No. 22784197.0, dated Aug. 24, 2023, 11 pages.

"Discussion on UE feedback enhancements for HARQ-ACK", 3GPP TSG-RAN WG1 Meeting #104-e, R1-2100968, Agenda: 8.3.1.1, Asia Pacific Telecom, Jan. 25-Feb. 5, 2021, 5 pages.

International Search Report and Written Opinion received for corresponding Patent Cooperation Treaty Application No. PCT/FI2022/050082, dated Jun. 9, 2022, 15 pages.

"HARQ-ACK Feedback Enhancements for URLLC/IIoT", 3GPP TSG RAN WG1 #104-e-bis, R1-2102819, Agenda: 8.3.1.1, Nokia, Apr. 12-20, 2021, 20 pages.

"HARQ procedure for NR-U", 3GPP TSG RAN WG1 #98bis, R1-1910821, Agenda: 7.2.2.2.3, LG Electronics, Oct. 14-20, 2019, 22 pages.

"3rd Generation Partnership Project; Technical Specification Group Radio Access Network; NR; Physical layer procedures for control (Release 16)", 3GPP TS 38.213, V16.5.0, Mar. 2021, pp. 1-183.

"HARQ-ACK Feedback Enhancements for URLLC/IIoT", 3GPP TSG RAN WG1 #106-e, R1-2106636, Agenda: 8.3.1.1, Nokia, Aug. 16-27, 2021, 27 pages.

* cited by examiner

INDICATION OF HARQ-ACK CODEBOOK FOR RETRANSMISSION

CROSS REFERENCE TO RELATED APPLICATION

This application claims the benefit of U.S. Provisional Application No. 63/172,138, filed Apr. 8, 2021, which is hereby incorporated by reference in its entirety.

TECHNICAL FIELD

The teachings in accordance with the exemplary embodiments of this invention relate generally to determining a specific PUCCH (physical uplink control channel) occasion for a HARQ-ACK codebook/information to be re-transmitted and, more specifically, relate to determining a PUCCH slot or sub-slot for the HARQ-ACK codebook/information to be re-transmitted by triggering downlink control information.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
5G 5$^{th}$ Generation
CB CodeBook
CSI Channel State Information
DCI Downlink Control Information
DL Downlink
gNB 5G/NR base station
HARQ Hybrid Automatic repeat Request
HARQ-ACK HARQ acknowledgment
NR New Radio
MAC CE Medium Access Control Control Element
PDCCH Physical Downlink Control Channel
PDSCH Physical Downlink Shared Channel
PUCCH Physical Uplink Control Channel
PUSCH Physical Uplink Shared Channel
PL Pathloss
RAN Radio Access Network
RS Reference Signal
SPS Semi-Persistent Scheduling
SR Scheduling Request
TPC Transmit power control
UCI Uplink Control Information
UE User Equipment
UL Uplink In technology proposals at the time of this application, 5th generation (5G) mobile communications technology provides higher capabilities of related operations such as transmission rate, a latency, power consumption, etc.

At the time of this application there are radio technology operations being developed including operations for generating hybrid automatic repeat request-acknowledgment (HARQ-ACK) codebooks for different services in a unit of a slot or sub-slot, and for generating a HARQ-ACK codebook by jointly encoding acknowledgment (ACK)/negative-acknowledgment (NACK) information that is to be fed back in a same slot.

Example embodiments of the invention relate to improvements of at least these operations.

SUMMARY

This section contains examples of possible implementations and is not meant to be limiting.

In an example aspect of the invention, there is an apparatus, such as a user equipment side apparatus, comprising: at least one processor; and at least one memory including computer program code, where the at least one memory and the computer program code are configured, with the at least one processor, to cause the apparatus to at least: identify, by a user equipment of a communication network, downlink control information, wherein the downlink control information is indicating that at least one hybrid automatic repeat request-acknowledgment codebook scheduled earlier for transmission needs to be re-transmitted in a physical uplink control channel occasion indicated by the downlink control information, and wherein the downlink control information is identifying at least one hybrid automatic repeat request-acknowledgment codebook scheduled earlier for transmission that needs to be re-transmitted in the physical uplink control channel occasion; and based on the downlink control information, prepare the physical uplink control channel for re-transmitting the at least one hybrid automatic repeat request-acknowledgment codebook in the physical uplink control channel occasion.

In another example aspect of the invention, there is a method comprising: identifying, by a user equipment of a communication network, downlink control information, wherein the downlink control information is indicating that at least one hybrid automatic repeat request acknowledgment codebook scheduled earlier for transmission needs to be re-transmitted in a physical uplink control channel occasion indicated by the downlink control information, and wherein the downlink control information is identifying at least one hybrid automatic repeat request-acknowledgment codebook scheduled earlier for transmission that needs to be re-transmitted in the physical uplink control channel occasion; and based on the downlink control information, preparing the physical uplink control channel for re-transmitting the at least one hybrid automatic repeat request-acknowledgment codebook in the physical uplink control channel occasion.

A further example embodiment is a method and/or apparatus comprising the apparatus and/or the method of the previous paragraphs, wherein the downlink control information includes a timing parameter and resource indicator of a physical uplink control channel, wherein based on the timing parameter, the user equipment finds a slot or sub-slot number PUCCH_retx_slot where the physical uplink control channel will be transmitted, wherein the identifying is based on the downlink control information carrying a time difference PUCCH_slot_indicator that is the time from a reference_slot or sub-slot to a slot or sub-slot number for which the hybrid automatic repeat request-acknowledgment codebook, to be re-transmitted, was scheduled earlier for transmission, wherein the reference slot or sub-slot can be identified as reference_slot, wherein the identifying is further based on the downlink control information indicating a priority of the codebook to be re-transmitted, wherein the user equipment uses a PUCCH_slot_indicator included in the downlink control information to determine a slot or sub-slot corresponding to the at least one hybrid automatic repeat request-acknowledgment codebook to be re-transmitted, wherein the reference slot or sub-slot is associated with a PUCCH_retx_slot of the physical uplink control channel, wherein the reference slot or sub-slot is associated with a DCI_slot of the reception of the downlink control information, wherein the reference slot or sub-slot is a slot or sub-slot of the physical uplink control channel occasion where the hybrid automatic repeat request-acknowledgment codebook scheduled earlier for transmission needs to be re-transmitted, wherein the reference slot or sub-slot is a slot or sub-slot where the downlink control information is received, wherein the slot or sub-slot number corresponding to the at least one hybrid automatic repeat request-acknowledgment codebook to be re-transmitted is based on PUCCH_slot=reference_slot−PUCCH_slot_indicator, wherein a value of the PUCCH_slot_indicator indicates a number X resulting in the user equipment determining the slot or sub-slot number corresponding to the at least one hybrid automatic repeat request-acknowledgment codebook to be re-transmitted as PUCCH_retx_slot −X, where X is an integer, wherein a value of the PUCCH_slot_indicator indicates a number X resulting in the user equipment determining the slot or sub-slot number corresponding to the at least one hybrid automatic repeat request-acknowledgment codebook to be re-transmitted as DCI_slot −X, where X is an integer, wherein there is choosing, by the user equipment, for the retransmission at least one hybrid automatic repeat request-acknowledgment codebook scheduled earlier for transmission in the slot or sub-slot PUCCH_slot, wherein the choosing is using a priority bit indication using one or more bits carried in the downlink control information, wherein based on the PUCCH_slot_indicator, the retransmission is after an initial transmission of the physical uplink control channel occasion corresponding to the at least one hybrid automatic repeat request-acknowledgment codebook to be re-transmitted, wherein the PUCCH_slot_indicator indicates one value of a set of different values and wherein the set of different values is predetermined and fixed or determined based on radio resource configuration (RRC), wherein a size of the downlink control information corresponds to a downlink assignment and triggering the downlink control information is distinguished by a different Radio Network Temporary Identifier scrambling the downlink control information, a downlink control information bit or a combination of downlink control information bits of one or more downlink control information fields, wherein the PUCCH_slot_indicator is mapped to an additional, specific downlink control information bit field in the downlink assignment for triggering the re-transmission, wherein the mapping is associated with a bit field of size M bits, wherein at least one of the 2^M states of the bitfield indicates the at least one hybrid automatic repeat request-acknowledgment codebook retransmission is not to be triggered and the other states indicate that the at least one hybrid automatic repeat request-acknowledgment codebook retransmission is to be triggered and at the same time indicating a value of the PUCCH_slot_indicator, wherein the PUCCH_slot_indicator is mapped to one or more existing, unused downlink control information bit field(s) if the triggering downlink control information is not able to schedule a downlink shared channel at the same time, wherein the mapping is associated with a bit field of size M bits of a physical downlink control shared channel, wherein at least one bit of the bit field is set to indicate that the downlink control information is requesting the at least one hybrid automatic repeat request-acknowledgment codebook retransmission, and/or wherein bits of the bit field are used to: indicate different values of the PUCCH_slot_indicator, or indicate triggering the at least one hybrid automatic repeat request-acknowledgment codebook retransmission based on the PUCCH_slot_indicator values and without scheduling a physical downlink control shared channel.

A non-transitory computer-readable medium storing program code, the program code executed by at least one processor to perform at least the method as described in the paragraphs above.

In another example aspect of the invention, there is an apparatus comprising: means for identifying, by a user equipment of a communication network, downlink control information, wherein the downlink control information is indicating that at least one hybrid automatic repeat request acknowledgment codebook scheduled earlier for transmission needs to be re-transmitted in a physical uplink control channel occasion indicated by the downlink control information, and wherein the downlink control information is identifying at least one hybrid automatic repeat request-acknowledgment codebook scheduled earlier for transmission that needs to be re-transmitted in the physical uplink control channel occasion; and means, based on the downlink control information, for preparing the physical uplink control channel for re-transmitting the at least one hybrid automatic repeat request-acknowledgment codebook in the physical uplink control channel occasion.

In accordance with the example embodiments as described in the paragraph above, at least the means for identifying and preparing comprises a network interface, and computer program code stored on a computer-readable medium and executed by at least one processor.

In an example aspect of the invention, there is an apparatus, such as a network side apparatus, comprising: at least one processor; and at least one memory including computer program code, where the at least one memory and the computer program code are configured, with the at least one processor, to cause the apparatus to at least: transmit, by a network equipment of a communication network, downlink control information to a user equipment of the communication network, wherein the downlink control information is indicating that at least one hybrid automatic repeat request-acknowledgment codebook scheduled earlier for transmission needs to be re-transmitted in a physical uplink control channel occasion indicated by the downlink control information, and wherein the downlink control information is identifying at least one hybrid automatic repeat request-acknowledgment codebook scheduled earlier for transmission that needs to be re-transmitted in the physical uplink control channel occasion; and based on the downlink control information, receiving by the network equipment the physical uplink control channel for re-transmitting the at least one hybrid automatic repeat request-acknowledgment codebook in the physical uplink control channel occasion from the user equipment.

In another example aspect of the invention, there is a method comprising: transmitting, by a network equipment of a communication network, downlink control information to a user equipment of the communication network, wherein the downlink control information is indicating that at least one hybrid automatic repeat request-acknowledgment codebook scheduled earlier for transmission needs to be re-transmitted in a physical uplink control channel occasion indicated by the downlink control information, and wherein the downlink control information is identifying at least one hybrid automatic repeat request-acknowledgment codebook scheduled earlier for transmission that needs to be re-transmitted in the physical uplink control channel occasion; and based on the downlink control information, receiving by the network equipment the physical uplink control channel for re-transmitting the at least one hybrid automatic repeat request-acknowledgment codebook in the physical uplink control channel occasion from the user equipment.

A further example embodiment is a method and/or apparatus comprising the apparatus and/or the method of the previous paragraphs, wherein the downlink control information includes a timing parameter and resource indicator of a physical uplink control channel, wherein the network equipment determines the timing parameter to define a slot or sub-slot number PUCCH_retx_slot where the physical uplink control channel will be received, wherein the identifying is based on the downlink control information carrying a time difference PUCCH_slot_indicator that is the time from a reference slot or sub-slot to a slot or sub-slot number for which the hybrid automatic repeat request-acknowledgment codebook, to be re-transmitted, was scheduled earlier for transmission, wherein the reference slot or sub-slot can be identified as reference_slot, wherein the identifying is further based on the downlink control information indicating a priority of the codebook to be re-transmitted, wherein the network equipment determines a PUCCH_slot_indicator included in the downlink control information to define a slot or sub-slot corresponding to the at least one hybrid automatic repeat request-acknowledgment codebook to be re-transmitted, wherein the reference slot or sub-slot is associated with a PUCCH_retx_slot of the physical uplink control channel reception, wherein the reference slot or sub-slot is associated with a DCI_slot of the transmission of the downlink control information, wherein the reference slot or sub-slot is a slot or sub-slot of the physical uplink control channel occasion where the re-transmission of the hybrid automatic repeat request-acknowledgment codebook scheduled earlier for transmission is to be received, wherein the reference slot or sub-slot is a slot or sub-slot where the downlink control information is transmitted, wherein the slot or sub-slot number corresponding to the at least one hybrid automatic repeat request-acknowledgment codebook to be re-transmitted is based on PUCCH_slot=reference_slot−PUCCH_slot_indicator, wherein a value of the PUCCH_slot_indicator indicates a number X resulting in the user equipment determining the slot or sub-slot number corresponding to the at least one hybrid automatic repeat request-acknowledgment codebook to be re-transmitted as PUCCH_retx_slot −X, where X is an integer, wherein a value of the PUCCH_slot_indicator indicates a number X resulting in the user equipment determining the slot or sub-slot number corresponding to the at least one hybrid automatic repeat request-acknowledgment codebook to be re-transmitted as DCI_slot −X, where X is an integer, wherein there is choosing, by the user equipment, for the retransmission at least one hybrid automatic repeat request-acknowledgment codebookscheduled earlier for transmission in the slot or sub-slot PUCCH_slot, wherein the choosing is using a priority bit indication using one or more bits carried in the downlink control information, wherein based on the PUCCH_slot_indicator, the reception is after an initial reception of the physical uplink control channel occasion corresponding to the at least one hybrid automatic repeat request-acknowledgment codebook to be re-transmitted, wherein the PUCCH_slot_indicator indicates one value of a set of different values and wherein the set of different values is predetermined and fixed or determined based on radio resource configuration (RRC), wherein a size of the downlink control information corresponds to a downlink assignment and triggering the downlink control information is distinguished by a different Radio Network Temporary Identifier scrambling the downlink control information, a downlink control information bit or a combination of downlink control information bits of one or more downlink control information fields, wherein the PUCCH_slot_indicator is mapped to an additional, specific downlink control information bit field in the downlink assignment for triggering the re-transmission by the user equipment, wherein the mapping is associated with a bit field of size M bits, wherein at least one of the 2^M states of the bitfield indicates the at least one hybrid automatic repeat request-acknowledgment codebook retransmission is not to be triggered and the other states indicate that the at least one hybrid automatic repeat request-acknowledgment codebook retransmission is to be triggered and at the same time indicating a value of the PUCCH_slot_indicator, wherein the PUCCH_slot_indicator is mapped to one or more existing, unused downlink control information bit field(s) if the triggering downlink control information is not able to schedule a downlink shared channel at the same time, wherein the mapping is associated with a bit field of size M bits of a physical downlink control shared channel, wherein at least one bit of the bit field is set to indicate that the downlink control information is requesting the at least one hybrid automatic repeat request-acknowledgment codebook retransmission, and/or wherein bits of the bit field are used to: indicate different values of the PUCCH_slot_indicator, or indicate triggering the at least one hybrid automatic repeat request-acknowledgment codebook retransmission based on the PUCCH_slot_indicator values and without scheduling a physical downlink control shared channel.

A non-transitory computer-readable medium storing program code, the program code executed by at least one processor to perform at least the method as described in the paragraphs above.

In another example aspect of the invention, there is an apparatus comprising: means for transmitting, by a network equipment of a communication network, downlink control information to a user equipment of the communication network, wherein the downlink control information is indicating that at least one hybrid automatic repeat request-acknowledgment codebook scheduled earlier for transmission needs to be re-transmitted in a physical uplink control channel occasion indicated by the downlink control information, and wherein the downlink control information is identifying at least one hybrid automatic repeat request-acknowledgment codebook scheduled earlier for transmission that needs to be re-transmitted in the physical uplink control channel occasion; and means, based on the downlink control information, for receiving by the network equipment the physical uplink control channel for re-transmitting the at least one hybrid automatic repeat request-acknowledgment codebook in the physical uplink control channel occasion from the user equipment.

In accordance with the example embodiments as described in the paragraph above, at least the means for receiving, indicating, identifying, and receiving comprises a network interface, and computer program code stored on a computer-readable medium and executed by at least one processor.

A communication system comprising the network side apparatus and the user equipment side apparatus performing operations as described above.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

Figure 1:
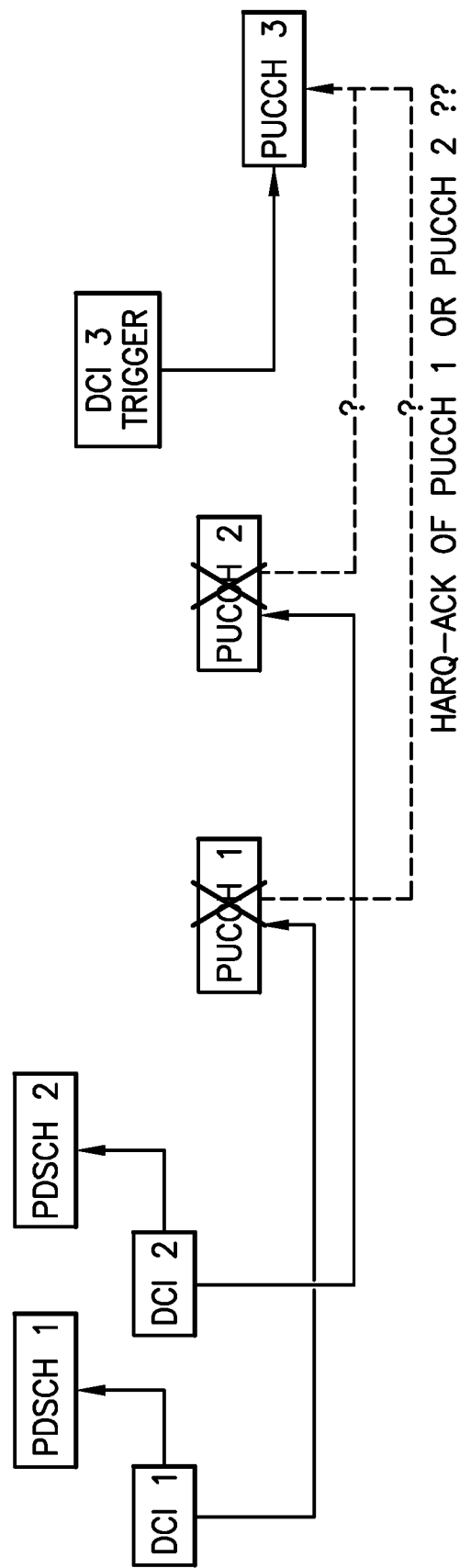
FIG. 1 shows an example problem setting where the HARQ-ACK of which PUCCH is to be mapped to PUCCH 3.

In example embodiments of the invention there is at least determining a PUCCH_slot or sub-slot for the HARQ-ACK codebook/information to be re-transmitted by triggering downlink control information.

In Rel-16 NR at the time of this application, there were two WIs targeting for a better support of IIoT/URLLC: URLLC L1 Enhancements and Industrial IoT (IIoT). An essential topic, included in both WIs, is Intra-UE Multiplexing/Prioritization addressing control-data, control-control, data-data multiplexing/prioritization.

For an efficient support of intra-UE multiplexing/prioritization, two-level of PHY priority (i.e., high-priority level 1/low-priority level 0) was introduced for UL data channels as well as UL control channels.

In Rel-16, only prioritization is supported between channels of different priorities, i.e. multiplexing between channels associated with different priorities is not supported, as can be seen from the following agreement:

Agreement:
For intra-UE collision handling at the PHY layer, in case a high-priority UL transmission overlaps with a low-priority UL transmission, drop the low-priority UL transmission under certain constraint (particularly timeline).

Such prioritization will lead to the fact that, in case of collisions, low-priority UL transmissions are cancelled leading also to the loss of low-priority uplink control information (UCI). Especially the loss of HARQ-ACK information leads to inefficiencies, as the gNB is not aware if an earlier DL data transmission on PDSCH has been successfully received at the UE or not. This will lead to the need for the gNB to either blindly schedule a re-transmission of the DL data (creating a larger overhead) due to the unknown information of the correct DL data reception or lead to higher layer re-transmission requests resulting in rather large delays.

In addition to intra-UE prioritization discussed above, also inter-UE prioritization was defined in Rel-16 URLLC WI. This means that the gNB can request a UE to stop an ongoing PUSCH transmission to free the resources for a higher priority transmission of another UE. Similarly here, any UCI information (incl. HARQ-ACK) multiplexed on the cancelled PUSCH transmission is lost and leads to the same DL data channel inefficiencies as for cancelation/dropping due to intra-UE prioritization discussed above.

As a consequence of this limitations of Rel-16 NR URLLC & IIoT operation, the topic of UE feedback enhancements for HARQ-ACK is addressed in the Rel-17 IIoT/URLLC WI, as can be seen below from the work item description in RP-201310:

1. Study, identify and specify if needed, required Physical Layer feedback enhancements for meeting URLLC requirements covering:
   UE feedback enhancements for HARQ-ACK [RAN1]
   CSI feedback enhancements to allow for more accurate MCS selection [RAN1]
   Note: DMRS-based CSI feedback is not in scope of this WI It is submitted that at least one important issue that needs to be discussed in Rel-17 can be about 'Retransmission of cancelled/dropped low-priority HARQ' as losing HARQ-ACK feedback can result in large performance degradation at least in terms of spectral efficiency. The related RAN1 agreement to have the retransmission of cancelled HARQ-ACK as one of the Rel-17 focus areas for study reads as follows:

Agreements: (from RAN1#102-e, Aug. 2020)
Study further at least the following schemes:
SPS HARQ skipping for 'skipped' SPS PDSCH
PUCCH repetition enhancements (at least for HARQ-ACK), e.g., sub-slot based, etc.
Retransmission of cancelled HARQ
SPS HARQ payload size reduction and / or skipping for 'non-skipped' SPS PDSCH
Type 1 HARQ codebook based on sub-slot PUCCH config
PUCCH carrier switching for HARQ feedback When triggering the retransmission, clearly the PUCCH resource would need to be indicated, but there the existing mechanisms of indicating the PUCCH resource can be used. In a DCI scheduling PDSCH (i.e., a DL assignment), this is indicated by the PUCCH resource indicator (PRI) together with the PDSCH-to-HARQ_feedback timing indicator which defines the (sub-slot) for the PUCCH and the PUCCH resource for the HARQ-ACK transmission. The same principle had been reused in Rel-16 already for the one-shot triggering of the Type-3 NR HARQ-ACK codebook (with or without PDSCH).

But what is not there, is how to define which past HARQ-ACK codebook (of which PUCCH occasion/slot) should be re-transmitted when focusing on the re-transmission of the HARQ-ACK information of a specific (e.g. dropped) PUCCH. The problems addressed with this invention may be easiest expressed with the help of FIG. 1.

The example of FIG. 1 shows the case that there had been two dropped/cancelled PUCCHs (with their respective HARQ-ACK codebooks), PUCCH 1 and PUCCH 2, which the gNB could not receive. The downlink control information DCI 3 is triggering the HARQ-ACK re-transmission on PUCCH 3, but the question is which HARQ-ACK information is to be mapped from the different PUCCHs. It has been proposed to enable the re-transmission of the last dropped PUCCH/HARQ-ACK codebook in the 3GPP discussions, but this has several limitations.

First of all, this means that in the case of FIG. 1, that the dropped HARQ-ACK information of PUCCH 1 cannot be requested to be re-transmitted, as e.g. it may not be possible to send the triggering DCI 3 before the dropped PUCCH 2 in case of TDD operation and consecutive PUCCH (sub)-slots. For this, it would be needed for the case of FIG. 1 above to indicate to the UE if the UE should re-transmit the HARQ-ACK information of PUCCH 1 or PUCCH 2 on the PUCCH 3 triggered through DCI 3.

Further, limiting the re-transmission possibilities to dropped/canceled HARQ-ACK only is rather limiting the potential usage of the feature enabling re-transmission of the HARQ-ACK of a specific PUCCH as it will not be possible for the gNB to request a re-transmission of transmitted (non-dropped/cancelled) HARQ-ACK information it did not receive correctly. By generalizing the feature to indicate which PUCCH/HARQ-ACK codebook is to be re-transmitted this allows the usage of this feature also in case of incorrect HARQ-ACK information reception by the gNB.

Figure 3:
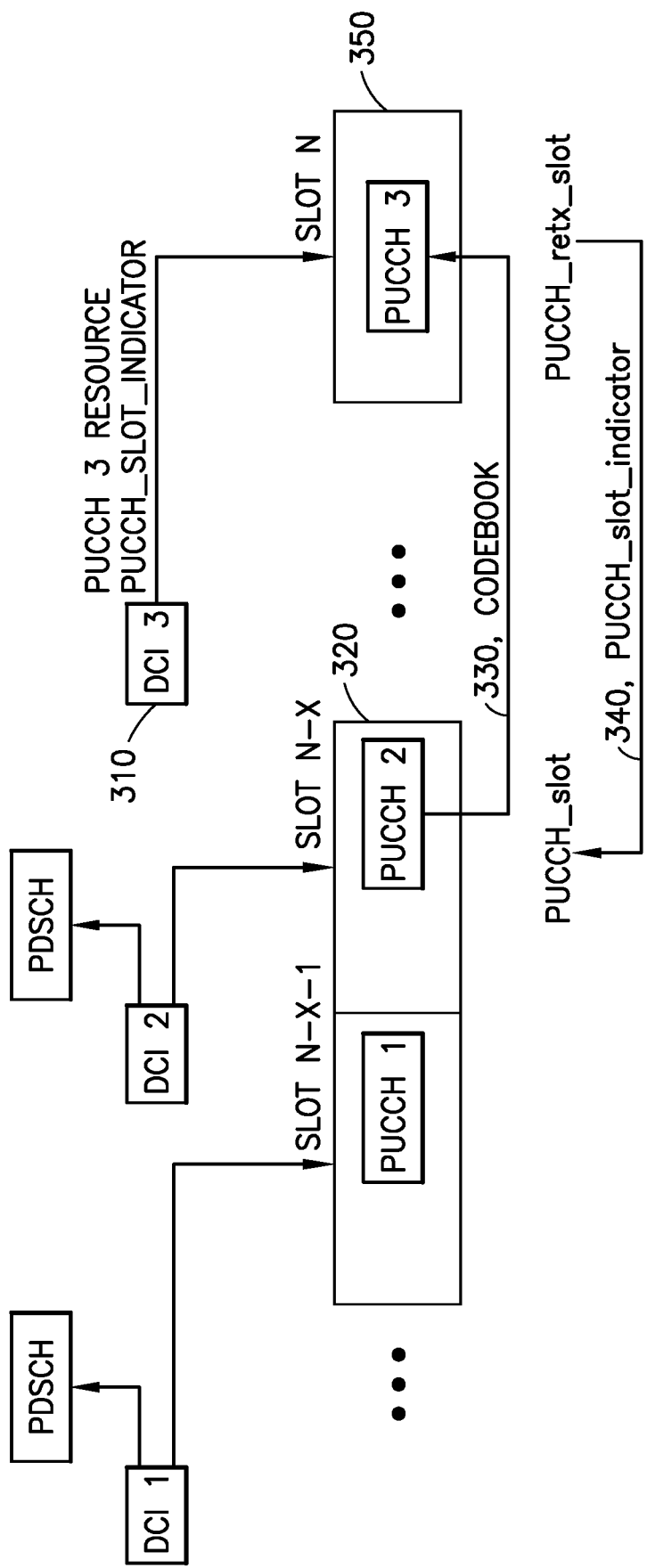
FIG. 3 shows, in accordance with example embodiments of the invention, an indication of the HARQ-ACK codebook to be re-transmitted using the slot for the PUCCH re-transmission as timing reference.

In addition, in standards body meetings it had been requested that the triggering should be possible as soon as the conflict or cancellation is determined. This basically means with respect to FIG. 1, that the DCI 3 triggering the re-transmission of PUCCH 2 could be sent actually before the occasion of PUCCH 2—as shown in FIG. 3. For this case, clearly just defining the 'last dropped PUCCH' will not be possible and there is a need to indicate the HARQ-ACK of which PUCCH is to be re-transmitted.

Therefore, at least an example embodiment of the invention focuses on how to indicate to the UE from which PUCCH the HARQ-ACK information/CB is to be re-transmitted in a certain PUCCH (sub-)slot determined by the triggering DCI.

Figure 5:
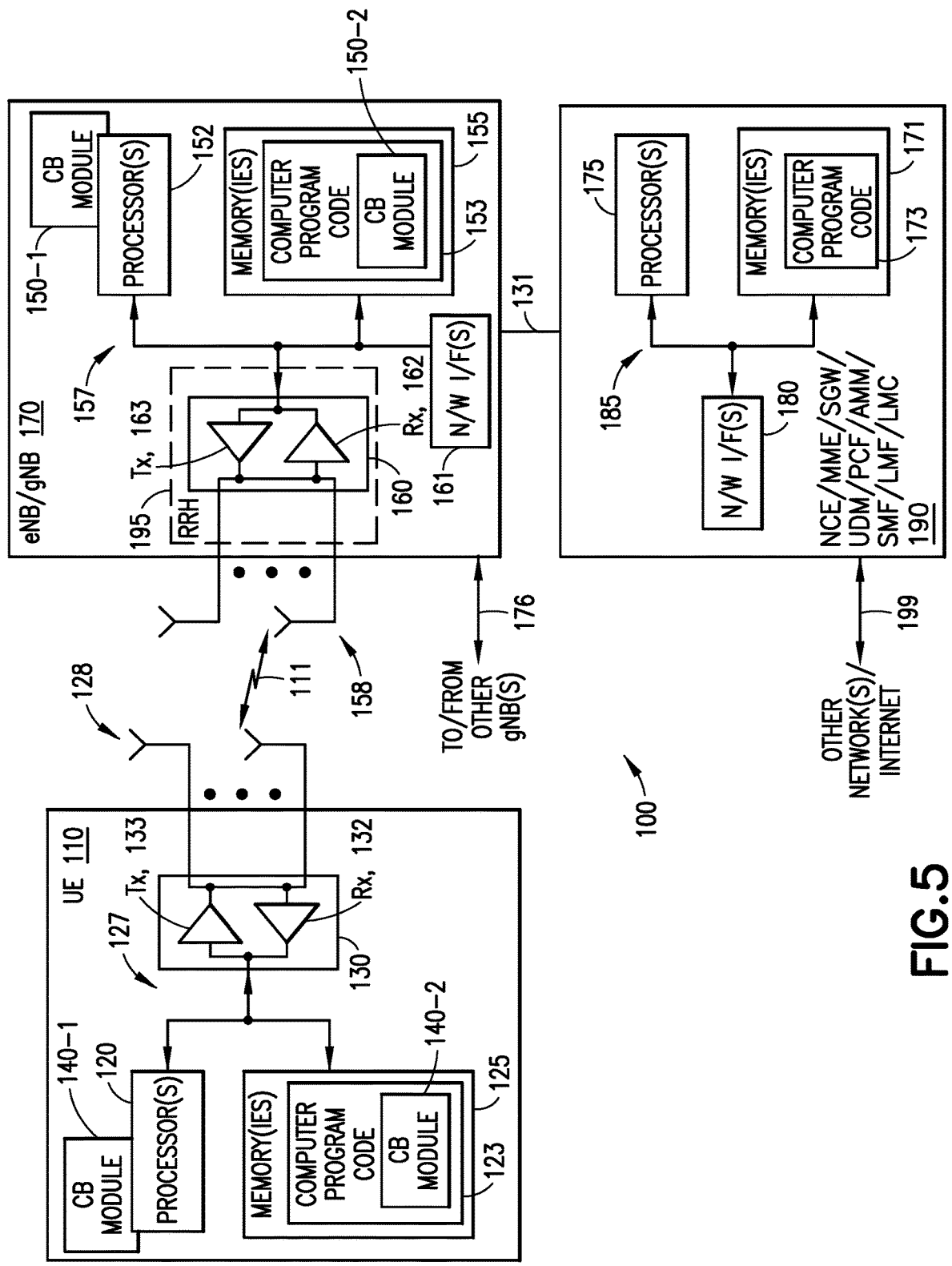
FIG. 5 shows a block diagram of one possible and non-limiting example system in which the example embodiments of the invention may be practiced.

Before describing the example embodiments of the invention in further detail reference is made to FIG. 5. FIG. 5 shows a block diagram of one possible and non-limiting exemplary system in which the exemplary embodiments may be practiced.

As shown in FIG. 5, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver Rx, 132 and a transmitter Tx 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 may include a CB (codebook) Module 140 which is configured to perform the example embodiments of the invention as described herein. The CB Module 140 may be implemented in hardware by itself of as part of the processors and/or the computer program code of the UE 110. The CB Module 140 comprising one of or both parts 140-1 and/or 140-2, which may be implemented in a number of ways. The CB Module 140 may be implemented in hardware as CB Module 140-1, such as being implemented as part of the one or more processors 120. The CB Module 140-1 may be implemented also as an integrated circuit or through other hardware such as a programmable gate array. In another example, the CB Module 140 may be implemented as CB Module 140-2, which is implemented as computer program code 123 and is executed by the one or more processors 120. Further, it is noted that the Determination modules 140-1 and/or 140-2 are optional. For instance, the one or more memories 125 and the computer program code 123 may be configured, with the one or more processors 120, to cause the user equipment 110 to perform one or more of the operations as described herein. The UE 110 communicates with gNB 170 via a wireless link 111.

The gNB 170 (NR/5G Node B or possibly an evolved NB) is a base station (e.g., for LTE, long term evolution) that provides access by wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver Rx 162 and a transmitter Tx 163. The one or more transceivers 160 are connected to one or more antennas 158. The one or more memories 155 include computer program code 153. The gNB 170 includes an CB (codebook) Module 150 which is configured to perform example embodiments of the invention as described herein. The CB Module 150 may comprise one of or both parts 150-1 and/or 150-2, which may be implemented in a number of ways. The CB Module 150 may be implemented in hardware by itself or as part of the processors and/or the computer program code of the gNB 170. CB Module 150-1, such as being implemented as part of the one or more processors 152. The CB Module 150-1 may be implemented also as an integrated circuit or through other hardware such as a programmable gate array. In another example, the CB Module 150 may be implemented as CB Module 150-2, which is implemented as computer program code 153 and is executed by the one or more processors 152. Further, it is noted that the Determination modules 150-1 and/or 150-2 are optional. For instance, the one or more memories 155 and the computer program code 153 may be configured to cause, with the one or more processors 152, the gNB 170 to perform one or more of the operations as described herein. The one or more network interfaces 161 communicate over a network such as via the links 176 and 131. Two or more gNB 170 may communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

It is noted that description herein indicates that "cells" perform functions, but it should be clear that the gNB that forms the cell will perform the functions. The cell makes up part of a gNB. That is, there can be multiple cells per gNB.

The wireless network 100 may include a NCE/MME/SGW/UDM/PCF/AMM/SMF/LMF/LMC 190, which can comprise a network control element (NCE), and/or serving gateway (SGW) 190, and/or MME (Mobility Management Entity) and/or SGW (Serving Gateway) functionality, and/or user data management functionality (UDM), and/or PCF (Policy Control) functionality, and/or Access and Mobility (AMF) functionality, and/or Session Management (SMF) functionality, Location Management Function (LMF), Location Management Component (LMC) and/or Authentication Server (AUSF) functionality and which provides connectivity with a further network, such as a telephone network and/or a data communications network (e.g., the Internet), and which is configured to perform any 5G and/or NR operations in addition to or instead of other standards operations at the time of this application. The NCE/MME/SGW/UDM/PCF/AMM/SMF/LMF/LMC 190 is configurable to perform operations in accordance with example embodiments of the invention in any of an LTE, NR, 5G and/or any standards based communication technologies being performed or discussed at the time of this application.

The gNB 170 is coupled via a link 131 to the NCE/MME/SGW/UDM/PCF/AMM/SMF/LMF/LMC 190. The link 131 may be implemented as, e.g., an S1 interface or N2 interface. The NCE/MME/SGW/UDM/PCF/AMM/SMF/LMF/LMC 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE/MME/SGW/UDM/PCF/AMM/SMF/LMF/LMC 190 to perform one or more operations. In addition, the NCE/MME/SGW/UDM/PCF/AMM/SMF/LMF/LMC 190, as are the other devices, is equipped to perform operations of such as by controlling the UE 110 and/or gNB 170 for 5G and/or NR operations in addition to any other standards operations implemented or discussed at the time of this application.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions and other functions as described herein to control a network device such as the UE 110, gNB 170, and/or NCE/MME/SGW/UDM/PCF/AMM/SMF/LMF/LMC 190 as in FIG. 5.

It is noted that functionality(ies), in accordance with example embodiments of the invention, of any devices as shown in FIG. 5 e.g., the UE 110 and/or gNB 170 can also be implemented by other network nodes, e.g., a wireless or wired relay node (a.k.a., integrated access and/or backhaul (IAB) node). In the IAB case, UE functionalities may be carried out by MT (mobile termination) part of the IAB node, and gNB functionalities by DU (Data Unit) part of the IAB node, respectively. These devices can be linked to the UE 110 as in FIG. 5 at least via the wireless link 111 and/or via the NCE/MME/SGW/UDM/PCF/AMM/SMF/LMF/LMC 190 using link 199 to Other Network(s)/Internet as in FIG. 5.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

As discussed above, it appears that options mentioned by companies has been only to (a) trigger the re-transmission of the latest dropped HARQ-ACK codebook (discussed above) or (b) apply a window where the dropped HARQ-ACK is accumulated.

The applicant is not aware of any disclosure of being able to indicate a specific PUCCH occasion for which the HARQ-ACK codebook/information should be re-transmission.

FIG. 3 shows, in accordance with example embodiments of the invention, an indication of the HARQ-ACK codebook to be re-transmitted using the slot for the PUCCH re-transmission as timing reference.

To identify the HARQ-ACK codebook for retransmission, UE follows the steps for a first embodiment listed below and depicted in FIG. 3.

1. UE receives RRC configuration to be prepared for retransmitting HARQ-ACK codebooks. When UE has constructed a codebook, it keeps the codebook in the memory for a certain time after the initially scheduled transmission time of the codebook;
2. In FIG. 3 UE searches from PDCCH a DCI that triggers codebook retransmission. The size of the DCI corresponds to a DL assignment and the triggering DCI is distinguished by a DCI bit or a combination of bits in a DCI bit field or by special RNTI. The DCI may trigger only codebook retransmission, or it can in addition assign PDSCH reception. Signaling for distinguishing these situations can be like with NR Type 3 codebook triggering. Another alternative is that specification or RRC configuration may limit the DCI to indicate either codebook retransmission or PDSCH assignment but not both. This alternative would allow minimizing the DCI size as existing bit fields for DL assignment can be used for signaling needed for codebook retransmission;
3. Further, as shown for steps 310 and 320 of FIG. 3 when UE finds a DCI (e.g., DCI 3) that triggers codebook retransmission, UE reads from the DCI the information for PUCCH that will carry the re-transmitted codebook. The information includes a timing parameter and resource indicator. Based on the timing parameter, UE finds a slot or a sub-slot number PUCCH_retx_slot where the PUCCH will be transmitted. The PUCCH timing and resource parameters can be carried in the same bit fields as in the case when the DCI carries DL assignment. For the example of FIG. 3, the DCI 3 indicating the re-transmission indicates PUCCH resource 3 to be transmitted in slot #N;

4. UE reads from the DCI a PUCCH_slot_indicator that it uses for calculating the slot or sub-slot corresponding to the codebook that it needs to retransmit. As shown with step 340 the slot or sub-slot number of the codebook to be re-transmitted is determined as PUCCH_slot=PUCCH_retx_slot−PUCCH_slot_indicator. For the example of FIG. 3, the indicated PUCCH_slot_indicator would be X resulting in the UE determining the PUCCH_slot as slot N−X;

5. As shown in step 320 of FIG. 3 a next step of finding the codebook to retransmit is to choose the right HARQ-ACK CB from those transmitted in the slot/sub-slot PUCCH_slot. This is done based on the PHY priority indication bit carried in the retransmission triggering DCI. A slot or sub-slot may carry at most two PUCCHs carrying HARQ-ACK and if two PUCCHs appear in one slot/sub-slot they are of different priority. Therefore, only a bit is needed to indicate the right CB within the slot/sub-slot PUCCH_slot. For simplicity, in FIG. 3 the PHY priority handling is not specifically captured, but the UE determines the HARQ-ACK codebook of PUCCH 2 in slot N−X as to be re-transmitted; and 6. As shown in steps 330 of FIG. 3 UE retransmits the codebook of (sub-)slot PUCCH_slot in (sub-)slot PUCCH_retx_slot. In case of FIG. 3, the codebook in slot N−X of PUCCH 2 is re-transmitted in slot N on PUCCH 3.

As shown in steps 350 of FIG. 3 there the DCI 3 indicates the PUCCH 3 resource to trigger the re-transmission in slot N at PUCCH 3. Further, the DCI indicates the PUCCH_slot_indicator as shown in step 340 of FIG. 3 that it uses for calculating the slot or sub-slot corresponding to the HARQ-ACK codebook for re-transmission.

In the procedure of the first embodiment (looking at FIG. 3), PUCCH 3 slot timing is the basis for indicating the slot timing of the HARQ-ACK CB for retransmission. First the PUCCH 3 timing is found e.g., in the same manner as with PUCCH for Type 3 CB; then simple slot/sub-slot counting is used for determining the slot/sub-slot of the codebook.

Figure 4:
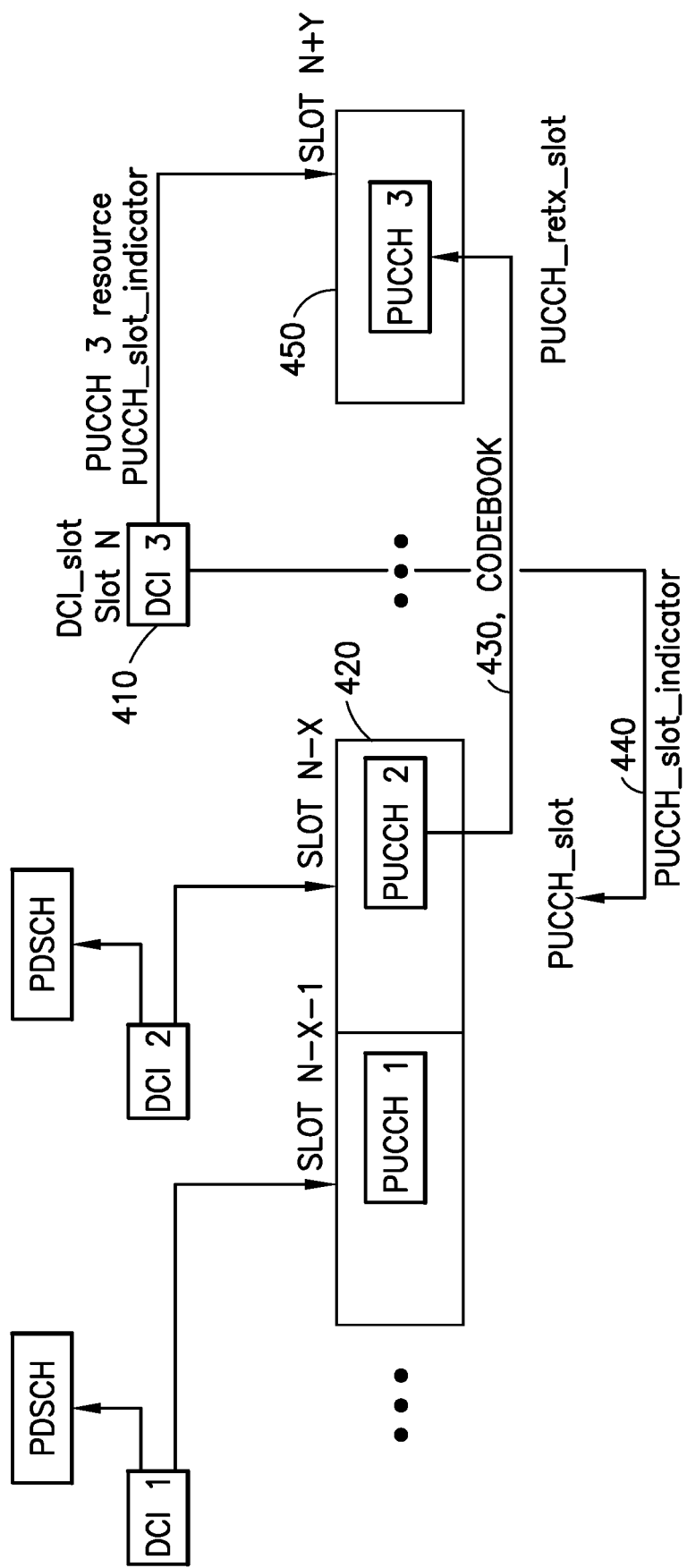
FIG. 4 shows, in accordance with example embodiments of the invention, an indication of the HARQ-ACK codebook to be re-transmitted using the triggering DCI as timing reference.

In contrast, there is a second embodiment envisioned, where the timing of the triggering DCI reception is the reference for defining the slot timing of the HARQ-ACK CB for re-transmission shown in FIG. 4.

FIG. 4 shows, in accordance with example embodiments of the invention, an indication of the HARQ-ACK codebook to be re-transmitted using the triggering DCI as timing reference. (Simplified for a situation that only one PUCCH per slot is allowed i.e., UE is not configured for two priorities).

As shown in FIG. 4, the following steps apply.

1. UE receives RRC configuration to be prepared for retransmitting HARQ-ACK codebooks. When UE has constructed a codebook, it keeps the codebook in the memory for a certain time after the initially scheduled transmission time of the codebook;
2. UE searches from PDCCH a DCI that triggers codebook retransmission. The size of the DCI corresponds to a DL assignment and the triggering DCI is distinguished by a DCI bit or a combination of bits in a DCI bit field or by special RNTI. The DCI may trigger only codebook retransmission, or it can in addition assign PDSCH reception. Signaling for distinguishing these situations can be like with NR Type 3 codebook triggering. Another alternative is that specification or RRC configuration may limit the DCI to indicate either codebook retransmission or PDSCH assignment but not both. This alternative would allow minimizing the DCI size as existing bit fields for DL assignment can be used for signaling needed for codebook retransmission;
3. Further, as shown in steps 410 and 420 of FIG. 4 UE finds a DCI (e.g., DCI 3) in slot or subslot DCI_slot that triggers codebook retransmission, UE reads from the DCI the information for PUCCH that will carry the re-transmitted codebook. The information includes a timing parameter and resource indicator. Based on the timing parameter, UE finds a slot or a sub-slot number PUCCH_retx_slot where the PUCCH will be transmitted. The PUCCH timing and resource parameters can be carried in the same bit fields as in the case when the DCI carries DL assignment. For the example of FIG. 4, the DCI 3 received in slot #N indicating the re-transmission indicates PUCCH resource 3 to be transmitted in slot #N+Y;
4. UE reads from the DCI a PUCCH_slot_indicator that it uses for calculating the slot or sub-slot corresponding to the codebook that it needs to retransmit. As shown with step 440 the slot or sub-slot number of the codebook to be re-transmitted is determined as PUCCH_slot=DCI_slot−PUCCH_slot_indicator. For as shown in the example as in step 450 of FIG. 4, the indicated PUCCH_slot_indicator would be X resulting in the UE determining the PUCCH_slot as slot N−X;
5. As shown in step 430 of FIG. 4 a next step of finding the codebook to retransmit is to choose the right HARQ-ACK CB from those transmitted in the slot/sub-slot PUCCH_slot. This is done based on the PHY priority indication bit carried in the retransmission triggering DCI. A slot or sub-slot may carry at most two PUCCHs carrying HARQ-ACK and if two PUCCHs appear in one slot/sub-slot they are of different priority. Therefore, only a bit is needed to indicate the right CB within the slot/sub-slot PUCCH_slot. For simplicity, in FIG. 4 the PHY priority handling is not specifically captured, but the UE determines the HARQ-ACK codebook of PUCCH 2 in slot N−X as to be re-transmitted; and/or
6. UE retransmits the codebook of (sub-)slot PUCCH_slot in (sub-)slot PUCCH_retx_slot. In case of FIG. 4, the codebook in slot N−X of PUCCH 2 is re-transmitted in slot N+Y on PUCCH 3.

As shown in steps 450 of FIG. 4 there the DCI 3 indicates the PUCCH 3 resource to trigger the re-transmission in slot N+Y at PUCCH 3. Further, the DCI indicates the PUCCH_slot_indicator as shown in step 440 of FIG. 4 used for calculating the slot or sub-slot corresponding to the HARQ-ACK codebook for re-transmission.

Figure 2:
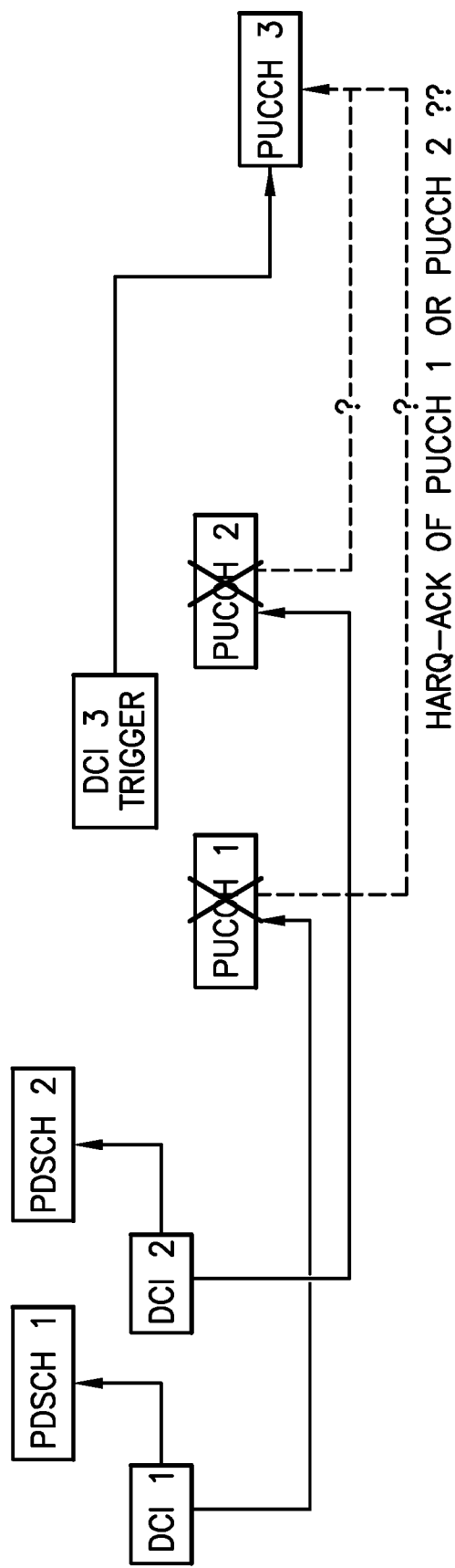
FIG. 2 shows another example problem setting where the HARQ-ACK of which PUCCH is to be mapped to PUCCH 3.

FIG. 2 shows another problem setting—the HARQ-ACK of which PUCCH is to be mapped to PUCCH 3 (case that triggering DCI is to be sent before actual PUCCH occasion of PUCCH 2).

When using the DCI triggering the HARQ-ACK re-transmission as the timing reference for the second embodiment compared to the slot of the PUCCH of the first embodiment, the following differences can be noted:

For the first embodiment, the indicated values of the PUCCH_slot_indicator would all be positive values as the re-transmission is only to happen after the initial transmission of the PUCCH (i.e., PUCCH_slot_indicator>0);

In contrast for the second embodiment, the set of PUCCH_slot_indicator values would also require negative values–as e.g. for the example of FIG. 2 the DCI would be received before the initial PUCCH transmission (i.e., requiring for this case also PUCCH_slot_indicator<=0); and Therefore, for the first embodiment the set of values required to indicate the PUCCH_slot_indicator basically define the time window in which a re-transmission is possible independently of the timing of the DCI reception—whereas when defining the values for the second embodiment the possible DCI reception timing needs to be considered when defining the related values (as discussed below).

For both embodiments, the signaling for requesting the codebook retransmission may look different in the alternatives (1) DCI may indicate simultaneously both codebook retransmission and PDSCH assignment and (2) DCI may indicate either codebook retransmission request or PDSCH assignment but not both.

For alternative (1) a new bit field of size M bits would be introduced; and

The available 2^M states could be used in the following way:
One state indicating that HARQ-ACK re-transmission is not to be triggered (e.g. state all '0'),
The remaining L=2^M−1 states would indicate triggering a re-transmission and at the same time define the PUCCH_slot_indicator (i.e., 2^M−1 different values for the PUCCH_slot_indicator can be indicated);

For alternative (2), setting one or more bit fields of a PDSCH assignment to certain values would indicate that DCI is for requesting HARQ-ACK CB retransmission and does not assign PDSCH. For instance, this may follow the way used with Type 3 CB (setting of frequency domain resource allocation bits to all '0' or all '1'). The unused bit fields in the DCI such as the HARQ process number field may be used to carry the PUCCH_slot_indicator. Assuming M bits, the available 2^M states could be for example used in the following ways:
One state (such as all '0' or all '1') could be reserved to indicate no retransmission, whereas the remaining L=(2^M−1) states could be used to indicate one of L different values of the PUCCH_slot_indicator for HARQ-ACK re-transmission. The 'no retransmission' state would allow distinguishing different situations where DCI does not assign PDSCH and where lacking PDSCH assignment is indicated the same way,
In another implementation, all the L=2^M states would indicate the PUCCH_slot_indicator (i.e., 2^M different values supported) as receiving the DCI without scheduling PDSCH would implicitly trigger the codebook re-transmission procedure.

For both alternatives (1) and (2), the L values of the PUCCH_slot_indicator could be defined in the specifications or alternatively a size L set of values for the PUCCH_slot_indicator could be higher layer configured.

As discussed previously, in case of first embodiment having the PUCCH slot as timing reference for PUCCH_slot_indicator only having positives values as an example the values [1,2, . . . , L] could be used.

For the second embodiment, if only having positive values (e.g. [1,2, . . . L]) as for the first embodiment, this would (a) not allow to trigger the re-transmission in the same slot as the triggering DCI which would require at least the value 0 and (b) would not allow the triggering DCI to be sent before the initial transmission of the dropped PUCCH which would require negative values for the PUCCH_slot_indicator.

Therefore, for the second embodiment there may be a higher need for a higher layer configuration of the set of values for the PUCCH_slot_indicator compared to the first embodiment. Alternatives for a fixed set for the second embodiment may include e.g. [1,2, . . . L] (having both limitations of (a) and (b)), including also the value of 0 i.e., [0,1,2, . . . , L−1] (having only the limitation of (b) but allowing (a)) or any set of combinations of positive and negative such as e.g. [−2, −1, 0, 1, 2, . . . , L−3].

The slot/sub-slot of PUCCH for HARQ-ACK CB retransmission (PUCCH 3 in FIG. 3 & FIG. 4) is given by the normal PDSCH-to-HARQ_feedback timing indicator that, in case no PDSCH is assigned, is interpreted the same way as with Type 3 CB to give a time offset relative to the DCI reception rather than to PDSCH.

When two PUCCHs per slot/sub-slot is possible (UE configured for two physical layer priorities and two PUCCH configurations), there is a priority bit in DCI that can be reused for indicating which one of the (possibly) two CBs in PUCCH_slot is wanted to be re-transmitted (the higher or the lower priority HARQ-ACK CB). The priority of the retransmission would follow the priority of the PUCCH with the CB to retransmit (PUCCH 2 in FIG. 3 & FIG. 4).

After the codebook for retransmission is found, it may happen that there is other, new (non-re-transmitted) HARQ-ACK to be also transmitted in slot N (or slot N+Y for the second embodiment). In this situation, UE will combine the HARQ-ACK to be re-transmitted (i.e., found in slot N−X) and the newly to be transmitted HARQ-ACK of slot N (or slot N+Y for the second embodiment) to create a new HARQ-ACK codebook for transmission of a certain PHY priority.

Figure 6A:
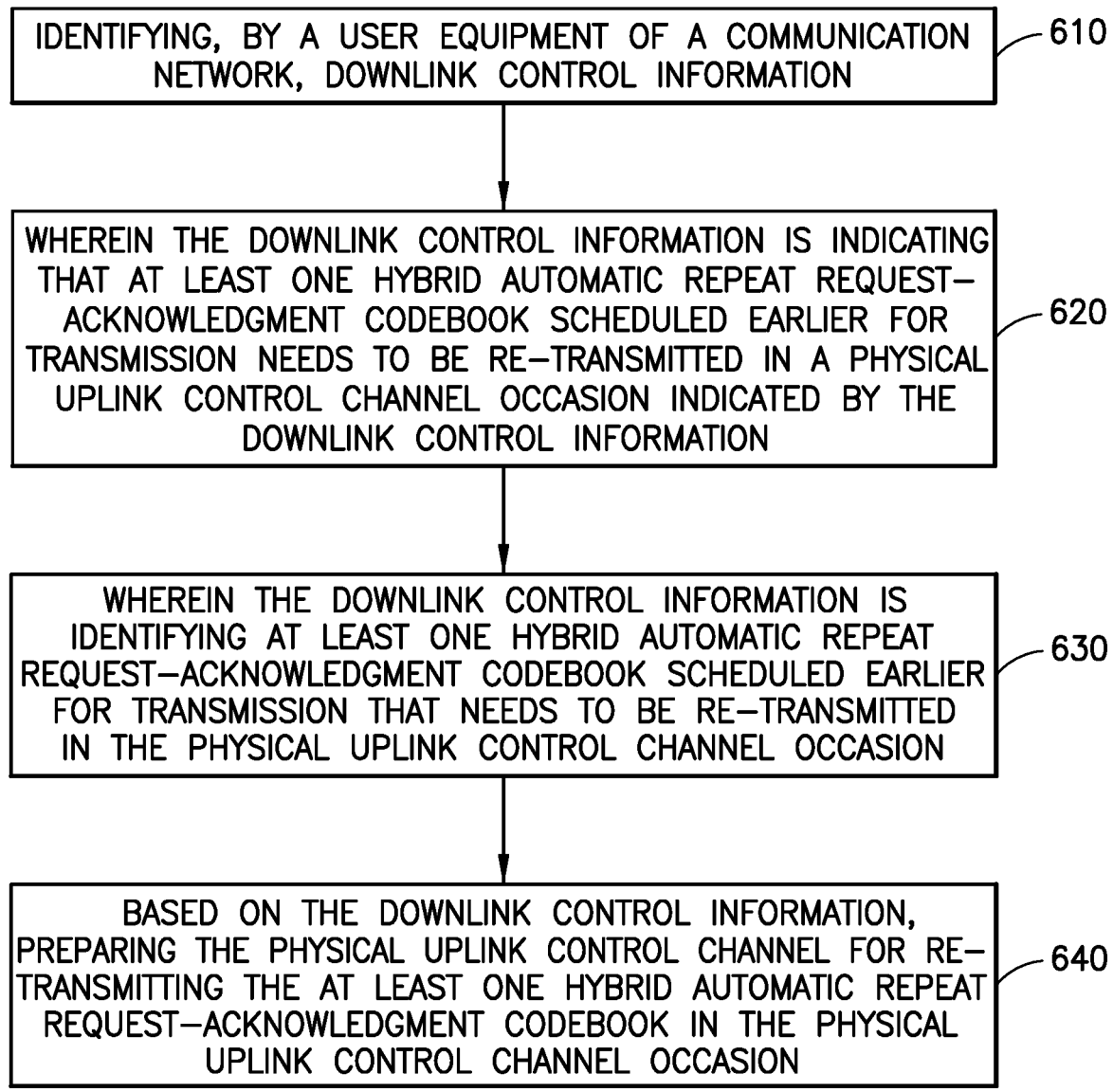
FIG. 6A and FIG. 6B each show a method in accordance with example embodiments of the invention which may be performed by an apparatus.

FIG. 6A illustrates operations which may be performed by a device such as, but not limited to, a device (e.g., the UE 110 as in FIG. 5). As shown in step 610 there is identifying, by a user equipment of a communication network, downlink control information. As shown in step 620 of FIG. 6A wherein the downlink control information is indicating that at least one hybrid automatic repeat request-acknowledgment codebook scheduled earlier for transmission needs to be re-transmitted in a physical uplink control channel occasion indicated by the downlink control information. As shown in step 630 of FIG. 6A wherein the downlink control information is identifying at least one hybrid automatic repeat request-acknowledgment codebook scheduled earlier for transmission that needs to be re-transmitted in the physical uplink control channel occasion. Then as shown in step 640 of FIG. 6A there is, based on the downlink control information, preparing the physical uplink control channel for re-transmitting the at least one hybrid automatic repeat request-acknowledgment codebook in the physical uplink control channel occasion.

In accordance with the example embodiments as described in the paragraph above, wherein the downlink control information includes a timing parameter and resource indicator of a physical uplink control channel.

In accordance with the example embodiments as described in the paragraphs above, wherein based on the timing parameter, the user equipment finds a slot or sub-slot number PUCCH_retx_slot where the physical uplink control channel will be transmitted.

In accordance with the example embodiments as described in the paragraphs above, wherein the identifying is based on the downlink control information carrying a time difference PUCCH_slot_indicator that is the time from a reference slot or sub-slot to a slot or sub-slot number for which the hybrid automatic repeat request-acknowledgment codebook, to be re-transmitted, was scheduled earlier for transmission, wherein the reference slot or sub-slot can be identified as reference_slot.

In accordance with the example embodiments as described in the paragraphs above, wherein the identifying is further based on the downlink control information indicating a priority of the codebook to be re-transmitted, wherein the user equipment uses a PUCCH_slot_indicator included in the downlink control information to determine a slot or sub-slot corresponding to the at least one hybrid automatic repeat request-acknowledgment codebook to be re-transmitted.

In accordance with the example embodiments as described in the paragraphs above, wherein the reference slot or sub-slot is associated with a PUCCH_retx_slot of the physical uplink control channel.

In accordance with the example embodiments as described in the paragraphs above, wherein the identifying is based on the downlink control information carrying a time difference PUCCH_slot_indicator that is the time from a reference slot or sub-slot to a slot or sub-slot number for which the hybrid automatic repeat request-acknowledgment codebook, to be re-transmitted, was scheduled earlier for transmission, wherein the reference slot or sub-slot can be identified as reference_slot.

In accordance with the example embodiments as described in the paragraphs above, wherein the identifying is further based on the downlink control information indicating a priority of the codebook to be re-transmitted.

In accordance with the example embodiments as described in the paragraphs above, wherein the user equipment uses a PUCCH_slot_indicator included in the downlink control information to determine a slot or sub-slot corresponding to the at least one hybrid automatic repeat request-acknowledgment codebook to be re-transmitted.

In accordance with the example embodiments as described in the paragraphs above, wherein the reference slot or sub-slot is associated with a PUCCH_retx_slot of the physical uplink control channel.

In accordance with the example embodiments as described in the paragraphs above, wherein the reference slot or sub-slot is associated with a DCI_slot of the reception of the downlink control information.

In accordance with the example embodiments as described in the paragraphs above, wherein the reference slot or sub-slot is a slot or sub-slot of the physical uplink control channel occasion where the hybrid automatic repeat request-acknowledgment codebook scheduled earlier for transmission needs to be re-transmitted.

In accordance with the example embodiments as described in the paragraphs above, wherein the reference slot or sub-slot is a slot or sub-slot where the downlink control information is received.

In accordance with the example embodiments as described in the paragraphs above, wherein the slot or sub-slot number corresponding to the at least one hybrid automatic repeat request-acknowledgment codebook to be re-transmitted is based on PUCCH_slot=reference_slot−PUCCH_slot_indicator In accordance with the example embodiments as described in the paragraphs above, wherein a value of the PUCCH_slot_indicator indicates a number X resulting in the user equipment determining the slot or sub-slot number corresponding to the at least one hybrid automatic repeat request-acknowledgment codebook to be re-transmitted as PUCCH_retx_slot −X, where X is an integer.

In accordance with the example embodiments as described in the paragraphs above, wherein a value of the PUCCH_slot_indicator indicates a number X resulting in the user equipment determining the slot or sub-slot number corresponding to the at least one hybrid automatic repeat request-acknowledgment codebook to be re-transmitted as DCI_slot −X, where X is an integer.

In accordance with the example embodiments as described in the paragraphs above, there is choosing, by the user equipment, for the retransmission at least one hybrid automatic repeat request-acknowledgment codebook scheduled earlier for transmission in the slot or sub-slot PUCCH_slot.

In accordance with the example embodiments as described in the paragraphs above, wherein the choosing is using a priority bit indication using one or more bits carried in the downlink control information.

In accordance with the example embodiments as described in the paragraphs above, wherein based on the PUCCH_slot_indicator, the retransmission is after an initial transmission of the physical uplink control channel occasion corresponding to the at least one hybrid automatic repeat request-acknowledgment codebook to be re-transmitted.

In accordance with the example embodiments as described in the paragraphs above, wherein the PUCCH_slot_indicator indicates one value of a set of different values and wherein the set of different values is predetermined and fixed or determined based on radio resource configuration (RRC).

In accordance with the example embodiments as described in the paragraphs above, wherein a size of the downlink control information corresponds to a downlink assignment and triggering the downlink control information is distinguished by a different Radio Network Temporary Identifier scrambling the downlink control information, a downlink control information bit or a combination of downlink control information bits of one or more downlink control information fields.

In accordance with the example embodiments as described in the paragraphs above, wherein the PUCCH_slot_indicator is mapped to an additional, specific downlink control information bitfield in the downlink assignment for triggering the re-transmission.

In accordance with the example embodiments as described in the paragraphs above, wherein the mapping is associated with a bit field of size M bits, wherein at least one of the 2^M states of the bitfield indicates the at least one hybrid automatic repeat request-acknowledgment codebook retransmission is not to be triggered and the other states indicate that the at least one hybrid automatic repeat request-acknowledgment codebook retransmission is to be triggered and at the same time indicating a value of the PUCCH_slot_indicator.

In accordance with the example embodiments as described in the paragraphs above, wherein the PUCCH_slot_indicator is mapped to one or more existing, unused downlink control information bit field(s) if the triggering downlink control information is not able to schedule a downlink shared channel at the same time.

In accordance with the example embodiments as described in the paragraphs above, wherein the mapping is associated with a bit field of size M bits of a physical downlink control shared channel, wherein at least one bit of the bit field is set to indicate that the downlink control information is requesting the at least one hybrid automatic repeat request-acknowledgment codebook retransmission.

In accordance with the example embodiments as described in the paragraphs above, wherein bits of the bit field are used to: indicate different values of the PUCCH_slot_indicator, or indicate triggering the at least one hybrid automatic repeat request-acknowledgment codebook retransmission based on the PUCCH_slot_indicator values and without scheduling a physical downlink control shared channel.

A non-transitory computer-readable medium (Memory(ies) 125 as in FIG. 5) storing program code (Computer Program Code 123 and/or CB Module 140-2 as in FIG. 5), the program code executed by at least one processor (Processor(s) 120 and/or CB Module 140-1 as in FIG. 5) to perform at least the operations as described in the paragraphs above.

In another example aspect of the invention, there is an apparatus comprising: means for identifying (one or more transceivers 130, Memory(ies) 125, Computer Program Code 123 and/or CB Module 140-2, and Processor(s) 120 and/or CB Module 140-1 as in FIG. 5), by a user equipment (UE 110 as in FIG. 5) of a communication network (Network 100 as in FIG. 5), downlink control information, wherein the downlink control information is indicating (one or more transceivers 130, Memory(ies) 125, Computer Program Code 123 and/or CB Module 140-2, and Processor(s) 120 and/or CB Module 140-1 as in FIG. 5) that at least one hybrid automatic repeat request acknowledgment codebook scheduled earlier for transmission needs to be re-transmitted in a physical uplink control channel occasion indicated by the downlink control information, and wherein the downlink control information is identifying (one or more transceivers 130, Memory(ies) 125, Computer Program Code 123 and/or CB Module 140-2, and Processor(s) 120 and/or CB Module 140-1 as in FIG. 5) at least one hybrid automatic repeat request-acknowledgment codebook scheduled earlier for transmission that needs to be re-transmitted in the physical uplink control channel occasion; and means, based on the downlink control information, for preparing (one or more transceivers 130, Memory(ies) 125, Computer Program Code 123 and/or CB Module 140-2, and Processor(s) 120 and/or CB Module 140-1 as in FIG. 5) the physical uplink control channel for re-transmitting the at least one hybrid automatic repeat request-acknowledgment codebook in the physical uplink control channel occasion.

In the example aspect of the invention according to the paragraph above, wherein at least the means for identifying and preparing comprises a non-transitory computer readable medium [Memory(ies) 125 as in FIG. 5] encoded with a computer program [Computer Program Code 123 and/or CB Module 140-2 as in FIG. 5] executable by at least one processor [Processor(s) 120 and/or CB Module 140-1 as in FIG. 5].

Figure 6B:
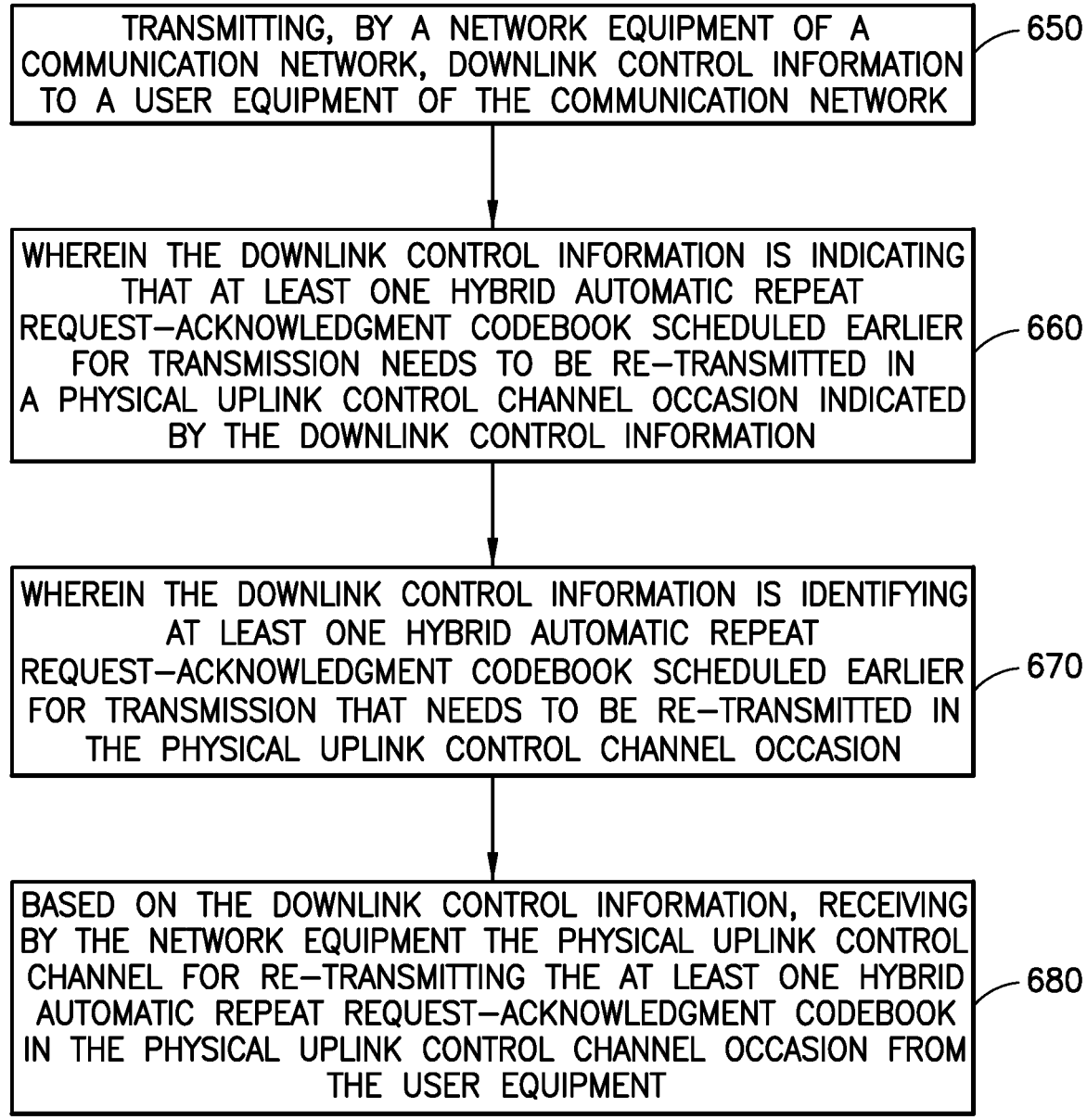

FIG. 6B illustrates operations which may be performed by a device such as, but not limited to, a network equipment (e.g., the eNB/gNB 170 as in FIG. 5). As shown in step 650 of FIG. 6B there is transmitting, by a network equipment of a communication network, downlink control information to a user equipment of the communication network. As shown in step 660 of FIG. 6B wherein the downlink control information is indicating that at least one hybrid automatic repeat request-acknowledgment codebook scheduled earlier for transmission needs to be re-transmitted in a physical uplink control channel occasion indicated by the downlink control information. In step 670 of FIG. 6B wherein the downlink control information is identifying at least one hybrid automatic repeat request-acknowledgment codebook scheduled earlier for transmission that needs to be re-transmitted in the physical uplink control channel occasion. Then as shown in step 680 of FIG. 6B there is, based on the downlink control information, receiving by the network equipment the physical uplink control channel for re-transmitting the at least one hybrid automatic repeat request-acknowledgment codebook in the physical uplink control channel occasion from the user equipment.

In accordance with the example embodiments as described in the paragraph above, wherein the downlink control information includes a timing parameter and resource indicator of a physical uplink control channel.

In accordance with the example embodiments as described in the paragraphs above, wherein the network equipment determines the timing parameter to define a slot or sub-slot number PUCCH_retx_slot where the physical uplink control channel will be received.

In accordance with the example embodiments as described in the paragraphs above, wherein the identifying is based on the downlink control information carrying a time difference PUCCH_slot_indicator that is the time from a reference slot or sub-slot to a slot or sub-slot number for which the hybrid automatic repeat request-acknowledgment codebook, to be re-transmitted, was scheduled earlier for transmission, wherein the reference slot or sub-slot can be identified as reference_slot.

In accordance with the example embodiments as described in the paragraphs above, wherein the identifying is further based on the downlink control information indicating a priority of the codebook to be re-transmitted.

In accordance with the example embodiments as described in the paragraphs above, wherein the network equipment determines a PUCCH_slot_indicator included in the downlink control information to define a slot or sub-slot corresponding to the at least one hybrid automatic repeat request-acknowledgment codebook to be re-transmitted.

In accordance with the example embodiments as described in the paragraphs above, wherein the reference slot or sub-slot is associated with a PUCCH_retx_slot of the physical uplink control channel reception.

In accordance with the example embodiments as described in the paragraphs above, wherein the reference slot or sub-slot is associated with a DCI_slot of the transmission of the downlink control information.

In accordance with the example embodiments as described in the paragraphs above, wherein the reference slot or sub-slot is a slot or sub-slot of the physical uplink control channel occasion where the re-transmission of the hybrid automatic repeat request-acknowledgment codebook scheduled earlier for transmission is to be received.

In accordance with the example embodiments as described in the paragraphs above, wherein the reference slot or sub-slot is a slot or sub-slot where the downlink control information is transmitted.

In accordance with the example embodiments as described in the paragraphs above, wherein the slot or sub-slot number corresponding to the at least one hybrid automatic repeat request-acknowledgment codebook to be re-transmitted is based on PUCCH_slot=reference_slot−PUCCH_slot_indicator In accordance with the example embodiments as described in the paragraphs above, wherein a value of the PUCCH_slot_indicator indicates a number X resulting in the user equipment determining the slot or sub-slot number corresponding to the at least one hybrid automatic repeat request-acknowledgment codebook to be re-transmitted as PUCCH_retx_slot −X, where X is an integer.

In accordance with the example embodiments as described in the paragraphs above, wherein a value of the PUCCH_slot_indicator indicates a number X resulting in the user equipment determining the slot or sub-slot number corresponding to the at least one hybrid automatic repeat request-acknowledgment codebook to be re-transmitted as DCI_slot −X, where X is an integer.

In accordance with the example embodiments as described in the paragraphs above, there is choosing, by the user equipment, for the retransmission at least one hybrid automatic repeat request-acknowledgment codebook scheduled earlier for transmission in the slot or sub-slot PUCCH_slot, wherein the choosing is using a priority bit indication using one or more bits carried in the downlink control information.

In accordance with the example embodiments as described in the paragraphs above, wherein based on the PUCCH_slot_indicator, the reception is after an initial reception of the physical uplink control channel occasion corresponding to the at least one hybrid automatic repeat request-acknowledgment codebook to be re-transmitted.

In accordance with the example embodiments as described in the paragraphs above, wherein the PUCCH_slot_indicator indicates one value of a set of different values and wherein the set of different values is predetermined and fixed or determined based on radio resource configuration (RRC).

In accordance with the example embodiments as described in the paragraphs above, wherein a size of the downlink control information corresponds to a downlink assignment and triggering the downlink control information is distinguished by a different Radio Network Temporary Identifier scrambling the downlink control information, a downlink control information bit or a combination of downlink control information bits of one or more downlink control information fields.

In accordance with the example embodiments as described in the paragraphs above, where the PUCCH_slot_indicator is mapped to an additional, specific downlink control information bit field in the downlink assignment for triggering the re-transmission by the user equipment.

In accordance with the example embodiments as described in the paragraphs above, wherein the mapping is associated with a bit field of size M bits, wherein at least one of the 2^M states of the bitfield indicates the at least one hybrid automatic repeat request-acknowledgment codebook retransmission is not to be triggered and the other states indicate that the at least one hybrid automatic repeat request-acknowledgment codebook retransmission is to be triggered and at the same time indicating a value of the PUCCH_slot_indicator.

In accordance with the example embodiments as described in the paragraphs above, wherein the PUCCH_slot_indicator is mapped to one or more existing, unused downlink control information bitfield(s) if the triggering downlink control information is not able to schedule a downlink shared channel at the same time.

In accordance with the example embodiments as described in the paragraphs above, wherein the mapping is associated with a bit field of size M bits of a physical downlink control shared channel, wherein at least one bit of the bit field is set to indicate that the downlink control information is requesting the at least one hybrid automatic repeat request-acknowledgment codebook retransmission.

In accordance with the example embodiments as described in the paragraphs above, wherein bits of the bit field are used to: indicate different values of the PUCCH_slot_indicator, or indicate triggering the at least one hybrid automatic repeat request-acknowledgment codebook retransmission based on the PUCCH_slot_indicator values and without scheduling a physical downlink control shared channel.

A non-transitory computer-readable medium (Memory(ies) 155 as in FIG. 5) storing program code (Computer Program Code 153 and/or CB Module 150-2 as in FIG. 5), the program code executed by at least one processor (Processor(s) 152 and/or CB Module 1550-1 as in FIG. 5) to perform at least the operations as described in the paragraphs above.

In another example aspect of the invention, there is an apparatus comprising: means for transmitting (one or more transceivers 160, Memory(ies) 155, Computer Program Code 153 and/or Block Module 150-2, and Processor(s) 120 and/or Block Module 150-1 as in FIG. 5), by a network equipment (eNB/gNB 170 as in FIG. 5) of a communication network (Network 100 as in FIG. 5), downlink control information to a user equipment (UE 110 as in FIG. 5) of the communication network, wherein the downlink control information is indicating (one or more transceivers 160, Memory(ies) 155, Computer Program Code 153 and/or Block Module 150-2, and Processor(s) 120 and/or Block Module 150-1 as in FIG. 5) that at least one hybrid automatic repeat request-acknowledgment codebook scheduled earlier for transmission needs to be re-transmitted in a physical uplink control channel occasion indicated by the downlink control information, and wherein the downlink control information is identifying (one or more transceivers 160, Memory(ies) 155, Computer Program Code 153 and/or Block Module 150-2, and Processor(s) 120 and/or Block Module 150-1 as in FIG. 5) at least one hybrid automatic repeat request-acknowledgment codebook scheduled earlier for transmission that needs to be re-transmitted in the physical uplink control channel occasion; and means, based on the downlink control information, for receiving (one or more transceivers 160, Memory(ies) 155, Computer Program Code 153 and/or Block Module 150-2, and Processor(s) 152 and/or Block Module 150-1 as in FIG. 5) by the network equipment the physical uplink control channel for re-transmitting the at least one hybrid automatic repeat request-acknowledgment codebook in the physical uplink control channel occasion from the user equipment.

In the example aspect of the invention according to the paragraph above, wherein at least the means for transmitting, indicating, identifying, and receiving comprises a non-transitory computer readable medium [Memory(ies) 155 as in FIG. 5] encoded with a computer program [Computer Program Code 153 and/or CB Module 150-2 as in FIG. 5] executable by at least one processor [Processor(s) 152 and/or CB Module 150-1 as in FIG. 5].

Example embodiments of the invention work to provide advantages including:

Enabling to indicate the PUCCH occasion of the HARQ-ACK codebook for re-transmission (in contrast to just allowing the last dropped HARQ-ACK codebook to be re-transmitted);

Enabling to indicate also the PUCCH re-transmission of non-dropped HARQ-ACK codebook by indicating the PUCCH occasion (in contrast to just allowing the last dropped HARQ-ACK codebook to be re-transmitted);

It is submitted that overall, when considering the advantages of using DCI triggering a specific CB of a PUCCH_slot for retransmission (compared to enhanced Type 2 and Type 3 CB) there is:

Having a smaller size of the codebook to be re-transmitted compared to using Type 3 codebook operation (or enhancements to Type 3 CB discussed in 3GPP RAN1 at the moment); and Enhanced Type 2 CB does not support re-transmission with operation of Type 1 CB. Moreover, enhanced Type 2 CB does not support re-transmission of HARQ-ACK of SPS PDSCH and the URLLC PHY priority handling is not supported either.

Further, in accordance with example embodiments of the invention there is circuitry for performing operations in accordance with example embodiments of the invention as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the invention as described herein.

In accordance with example embodiments of the invention as disclosed in this application this application, the "circuitry" provided can include at least one or more or all of the following:

(a) hardware-only circuit implementations (such as implementations in only analog and/or digital circuitry);

(b) combinations of hardware circuits and software, such as (as applicable):

(i) a combination of analog and/or digital hardware circuit(s) with software/firmware; and (ii) any portions of hardware processor(s) with software (including digital signal processor(s)), software, and memory(ies) that work together to cause an apparatus, such as a mobile phone or server, to perform various functions, such as functions or operations in accordance with example embodiments of the invention as disclosed herein); and (c) hardware circuit(s) and or processor(s), such as a microprocessor(s) or a portion of a microprocessor(s), that requires software (e.g., firmware) for operation, but the software may not be present when it is not needed for operation."

In accordance with example embodiments of the invention, there is adequate circuitry for performing at least novel operations as disclosed in this application, this 'circuitry' as may be used herein refers to at least the following:

(a) hardware-only circuit implementations (such as implementations in only analog and/or digital circuitry); and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although example embodiments of the invention is not limited thereto. While various aspects of the example embodiments of invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus comprising:
    at least one processor; and
    at least one non-transitory memory including computer program code, where the at least one memory and the computer program code are configured, with the at least one processor, to cause the apparatus to at least:
    identify, by a user equipment of a communication network, downlink control information,
    wherein the downlink control information indicating that at least one hybrid automatic repeat request-acknowledgment codebook scheduled earlier for transmission needs to be re-transmitted in a physical uplink control channel occasion indicated by the downlink control information, and
    wherein the downlink control information identifying which at least one hybrid automatic repeat request-acknowledgment codebook scheduled earlier for transmission needs to be re-transmitted in the physical uplink control channel occasion; and
    based on the downlink control information, prepare the physical uplink control channel for re-transmitting the identified at least one hybrid automatic repeat request-acknowledgment codebook in the physical uplink control channel occasion.

2. The apparatus of claim 1, wherein the downlink control information includes a timing parameter and resource indicator of a physical uplink control channel.

3. The apparatus of claim 2, wherein based on the timing parameter, the user equipment finds a slot or sub-slot number PUCCH_retx_slot where the physical uplink control channel will be transmitted.

4. The apparatus of claim 1, wherein the identifying is based on the downlink control information carrying a time difference PUCCH_slot_indicator that is a time from a reference slot or sub-slot to a slot or sub-slot number for which a hybrid automatic repeat request-acknowledgment codebook, to be re-transmitted, was scheduled earlier for transmission, wherein the reference slot or sub-slot can be identified as reference_slot.

5. The apparatus of claim 4, wherein the identifying is further based on the downlink control information indicating a priority of a codebook to be re-transmitted.

6. The apparatus of claim 4, wherein the reference slot or sub-slot is associated with a DCI_slot of the reception of the downlink control information.

7. The apparatus of claim 4, wherein the reference slot or sub-slot is a slot or sub-slot where the downlink control information is received.

8. The apparatus of claim 1, wherein the user equipment uses a PUCCH_slot_indicator included in the downlink control information to determine a slot or sub-slot corresponding to the identified at least one hybrid automatic repeat request-acknowledgment codebook to be re-transmitted.

9. The apparatus of claim 8, wherein the slot or sub-slot number corresponding to the identified at least one hybrid automatic repeat request-acknowledgment codebook to be re-transmitted is based on PUCCH_slot=reference_slot−PUCCH_slot_indicator.

10. The apparatus of claim 8, wherein a value of the PUCCH_slot_indicator indicates a number X resulting in the user equipment determining the slot or sub-slot number corresponding to the at least one identified hybrid automatic repeat request-acknowledgment codebook to be re-transmitted as DCI_slot −X, where X is an integer.

11. The apparatus of claim 8, wherein based on the PUCCH_slot_indicator, the retransmission is after an initial transmission of the physical uplink control channel occasion corresponding to the identified at least one hybrid automatic repeat request-acknowledgment codebook to be re-transmitted.

12. The apparatus of claim 8, wherein the PUCCH_slot_indicator is mapped to one or more existing, unused downlink control information bit field(s) if a triggering downlink control information is not able to schedule a downlink shared channel at the same time.

13. The apparatus of claim 12, wherein the mapping is associated with a bit field of size M bits of a physical downlink control shared channel, wherein at least one bit of the bit field is set to indicate that the downlink control information is requesting the identified at least one hybrid automatic repeat request-acknowledgment codebook retransmission.

14. The apparatus of claim 13, wherein bits of the bit field are used to:
    indicate different values of the PUCCH_slot_indicator, and/or
    indicate triggering the identified at least one hybrid automatic repeat request-acknowledgment codebook retransmission based on the PUCCH_slot_indicator values and without scheduling a physical downlink control shared channel.

15. The apparatus of claim 1, wherein the at least one non-transitory memory including the computer program code is configured with the at least one processor to cause the apparatus to:
    choose, by the user equipment, for the retransmission an identified at least one hybrid automatic repeat request-acknowledgment codebook scheduled earlier for transmission in the slot or sub-slot PUCCH_slot,
    wherein the choosing uses a priority bit indication using one or more bits carried in the downlink control information.

16. The apparatus of claim 1, wherein a size of the downlink control information corresponds to a downlink assignment and the downlink control information is distinguished as a triggering downlink control information by a Radio Network Temporary Identifier scrambling the downlink control information, a downlink control information bit or a combination of downlink control information bits of one or more downlink control information fields.

17. An apparatus comprising:
at least one processor; and
at least one non-transitory memory including computer program code, where the at least one memory and the computer program code are configured, with the at least one processor, to cause the apparatus to at least:
transmit, by a network equipment of a communication network, downlink control information to a user equipment of the communication network,
wherein the downlink control information indicating that at least one hybrid automatic repeat request-acknowledgment codebook scheduled earlier for transmission needs to be re-transmitted in a physical uplink control channel occasion indicated by the downlink control information, and
wherein the downlink control information identifying which at least one hybrid automatic repeat request-acknowledgment codebook scheduled earlier for transmission needs to be re-transmitted in the physical uplink control channel occasion; and
based on the downlink control information, receive by the network equipment the physical uplink control channel for re-transmitting the identified at least one hybrid automatic repeat request-acknowledgment codebook in the physical uplink control channel occasion from the user equipment.

18. The apparatus of claim 17, wherein the at least one memory and the computer program code are further configured, with the at least one processor, to cause the apparatus to at least one of:
determine, by the network equipment, a timing parameter included in the downlink control information to define a slot or sub-slot number PUCCH_retx_slot where the physical uplink control channel will be received; or
determine, by the network equipment, a PUCCH_slot_indicator included in the downlink control information to define a slot or sub-slot corresponding to the identified at least one hybrid automatic repeat request-acknowledgment codebook to be re-transmitted.

19. The apparatus of claim 18, wherein at least one of:
the slot or sub-slot number corresponding to the identified at least one hybrid automatic repeat request-acknowledgment codebook to be re-transmitted is based on PUCCH_slot=reference_slot−PUCCH_slot_indicator;
a value of the PUCCH_slot_indicator indicates a number X resulting in the user equipment determining the slot or sub-slot number corresponding to the identified at least one hybrid automatic repeat request-acknowledgment codebook to be re-transmitted as DCI_slot −X, where X is an integer;
based on the PUCCH_slot_indicator, the reception is after an initial reception of the physical uplink control channel occasion corresponding to the identified at least one hybrid automatic repeat request-acknowledgment codebook to be re-transmitted; or
the PUCCH_slot_indicator is mapped to one or more existing, unused downlink control information bit field(s) if a triggering downlink control information is not able to schedule a downlink shared channel at the same time.

20. The apparatus of claim 19, wherein the mapping is associated with a bit field of size M bits of a physical downlink control shared channel, wherein at least one bit of the bit field is set to indicate that the downlink control information is requesting the at least one hybrid automatic repeat request-acknowledgment codebook retransmission.

21. The apparatus of claim 20, wherein bits of the bit field are used to:
indicate different values of the PUCCH_slot_indicator, or
indicate triggering the at least one hybrid automatic repeat request-acknowledgment codebook retransmission based on the PUCCH_slot_indicator values and without scheduling a physical downlink control shared channel.

22. The apparatus of claim 17, wherein the identifying is based on the downlink control information carrying a time difference PUCCH_slot_indicator that is the time from a reference slot or sub-slot to a slot or sub-slot number for which a hybrid automatic repeat request-acknowledgment codebook, to be re-transmitted, was scheduled earlier for transmission, wherein the reference slot or sub-slot can be identified as reference_slot.

23. The apparatus of claim 22, wherein at least one of:
the identifying is further based on the downlink control information indicating a priority of a hybrid automatic repeat request-acknowledgment codebook to be re-transmitted;
the reference slot or sub-slot is associated with a DCI_slot of the transmission of the downlink control information; or
the reference slot or sub-slot is a slot or sub-slot where the downlink control information is transmitted.

24. The apparatus of claim 17, wherein a size of the downlink control information corresponds to a downlink assignment and the downlink control information is distinguished as a triggering downlink control information by a Radio Network Temporary Identifier scrambling the downlink control information, a downlink control information bit or a combination of downlink control information bits of one or more downlink control information fields.

* * * * *